Patented Oct. 19, 1948

UNITED STATES PATENT OFFICE 2,451,739

PROCESS FOR THE MANUFACTURE OF PENTAENES

Otto Isler, Basel, Switzerland, assignor to Hoffmann-La Roche Inc., Nutley, N. J., a corporation of New Jersey No Drawing. Application February 18, 1947, Serial No. 729,399. In Switzerland October 18, 1945

Section 1, Public Law 690, August 8, 1946
Patent expires October 18, 1965

21 Claims. (Cl. 260—617)

This invention relates to the manufacture of pentaenes.

The constitution of vitamin A has been known since 1933 (Karrer, "Helvetica Chimica Acta," vol. 16, year 1933, page 557). Many experiments have since been undertaken with a view to obtaining substances possessing vitamin A activity. In 1942, it was thus suggested to prepare compounds possessing the constitution of vitamin A from 4-(2',6',6'-trimethyl - cyclohexene - (1') - yl)-2-methyl-butene-(2)-al-(1) in the following manner (Heilbron, "Journal of the Chemical Society of London," year 1942, page 727). Addition of acetylene and methyl-omega-alkoxy-ethyl-ketone or the condensation product thereof, respectively, aniono-tropic rearrangement, partial hydrogenation of the triple bond and splitting off of water at any stage of the synthesis. However, so far no substantial success in this respect has been reported. Similar processes for the manufacture of vitamin A and vitamin A esters are claimed by N. Milas in U. S. patent specifications Numbers 2,369,156, 2,369,160 through 2,369,168, and 2,382,085. However, a wrong structural formula is ascribed to the aldehyde $C_{14}H_{22}O$, and, consequently, it is not recognized that prior to dehydration the condensation products must be subjected to an allyl rearrangement. The vitamin A carbon-skeleton consisting of 20 carbon atoms is thus built up by Milas step by step from the $C_{14}$-aldehyde by addition of acetylene and, in given cases after previous splitting off of water, by condensation of the compound containing 16 carbon atoms thus formed with methylvinyl ketone or with esters of 1-hydroxy-butanone.

It has now been found, according to the present invention that vitamin A-active compounds can be obtained by condensing 4-(2',6',6'-trimethyl-cyclohexene-(1')-yl)- 2 -methyl-butene-(2)-al-(1), by a Grignard reaction, with 1-hydroxy-3-methyl-pentene-(2)-yne-(4) and, in optional sequence, partially hydrogenating at the triple bond by the action of 1 mol hydrogen and, on the other hand, preferably by previous esterification of the terminal hydroxyl group, effecting dehydration and allyl-rearrangement of the 1-hydroxy-3,7-dimethyl - 6 - hydroxy-9-trimethylcyclohexenyl - nonadiene - (2,7) - yne - (4) thus formed, and, if desired, saponifying the pentaene formed.

The synthesis may be illustrated by the following formulae:

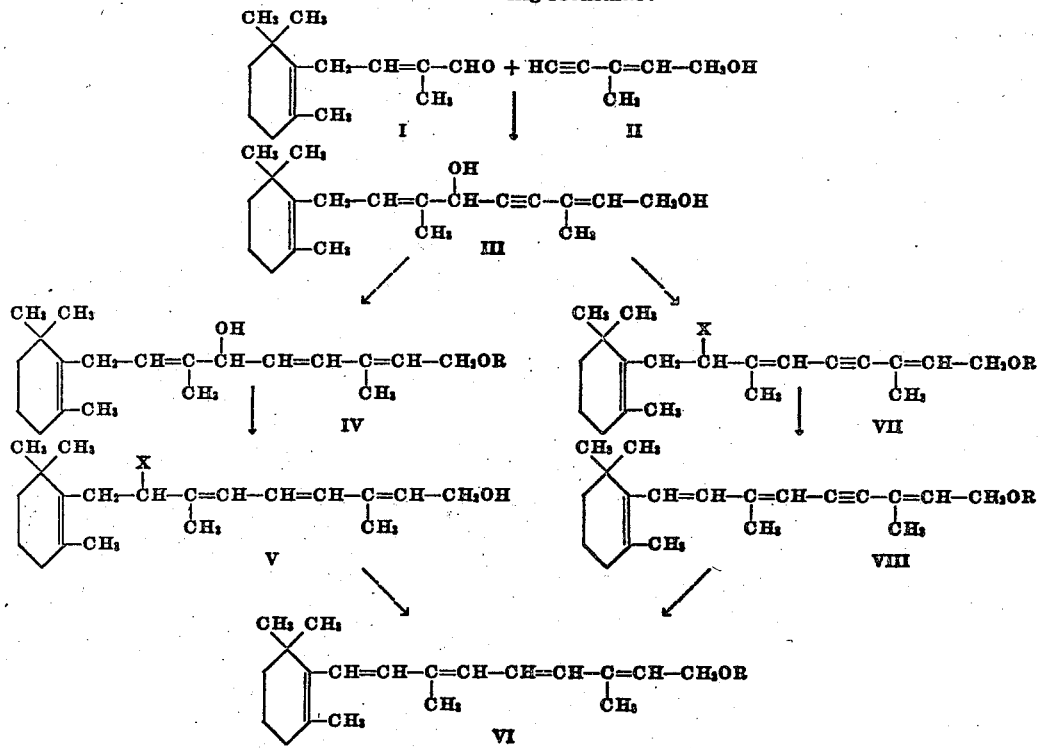

X=hydroxyl, halogen or acyloxy
R=hydrogen or acyl

The synthesis of vitamin A and its esters, which contain the sensitive system of five double bonds conjugated to one another, may thus be effected by uniting the two parts I and II to condensation product III carrying three double bonds and one triple bond, only two of which are conjugated to one another. From this condensation product the pentaene chain is formed by partial hydrogenation of the triple bond and by allyl rearrangement and dehydration for the purpose of introduction of a further double bond.

The required starting materials, i. e.: 4-trimethyl-cyclohexenyl - 2 - methyl-butene-(2)-al-(1) I and 1-hydroxy-3-methyl-pentene-(2)-yne-(4) II, may be prepared as follows:

4-(2',6',6' - trimethyl - cyclohexene - (1')-yl)-2-methyl-butene-(2)-al-(1) is obtained from β-ionone by a glycide ester synthesis, saponification of the glycide ester formed, and decarboxylation of the glycide acid.

1-hydroxy-3-methyl-pentene-(2)-yne-(4) is obtained by reacting 3-hydroxy-3-methyl-pentene-(1)-yne-(4) (the condensation product of methylvinylketone and acetylene) with mineral acids, rearrangement of the double bond and the hydroxyl group occurring thereby. For this purpose shaking for 4 to 5 days at room temperature with 10 per cent. aqueous sulphuric acid may, for instance, be employed.

The preparation of vitamin A or vitamin A esters, respectively, may be carried out in the following manner: Condensation of 4-(2',6',6'-trimethyl - cyclohexene -( 1') - yl) - 2 - methyl-butene-(2)-al-(1), by means of a Grignard reaction, with 1-hydroxy-3-methyl-pentene-(2)-yne-(4); partial hydrogenation at the triple bond of the 1-hydroxy-3,7-dimethyl-6-hydroxy-9-trimethyl-cyclohexenyl-nonadiene-(2,7)-yne-(4) formed by the action of 1 mol hydrogen; preferably, esterification of the 1-hydroxy-3,7-dimethyl-6-hydroxy-9-trimethyl-cyclohexenyl-nonatriene-(2,4,7) obtained at the terminal hydroxyl group thereof; dehydration and allyl rearrangement, and, if desired, saponification of the vitamin A ester thus obtained.

The first step of the present process is a Grignard reaction by which 1-hydroxy-3-methyl-pentene-(2)-yne-(4) is first reacted with 2 equivalents of alkyl magnesium halide (for instance, ethyl magnesium bromide). The product of this reaction may be represented by the formula

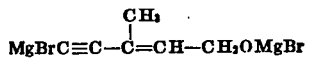

The magnesium compound formed is condensed with 4-trimethyl-cyclohexenyl-2-methyl-butene-(2)-al-(1) in the manner known per se. The reaction is effected in the usual solvents, such as, for instance, ethyl ether. The product of this condensation may be represented by the formula

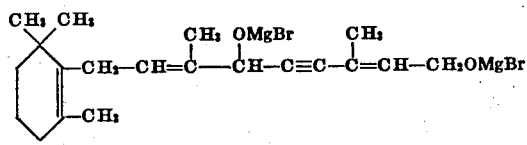

The reaction product is hydrolised in the usual manner, for instance, with an ammonium salt solution. Any parts of the aldehyde not having entered into reaction may be separated off in form of a derivative, for instance, as semicarbazone. The condensation product III thus obtained, i. e., 1-hydroxy-3,7-dimethyl-6-hydroxy-9 - trimethyl - cyclohexenyl - nonadiene - (2,7)- yne-(4), may be purified by chromatography or by distillation in vacuo. It is a very viscous, yellowish oil which could not be crystallized so far. It does not absorb ultraviolet rays of higher wave length than 260 mµ; the solution in arsenic trichloride is of violet colour. The Zerewitinoff analysis yields values corresponding to two active hydrogen atoms. $n_D^{20}=1.527$.

The condensation product III, suitably after purification, is then partially hydrogenated at the triple bond. For this purpose, means customarily adopted for polyene compounds may be employed. The addition of hydrogen is preferably carried out by catalytic hydrogenation in the presence of palladium catalysts, such as, for instance, palladium calcium carbonate and palladium barium sulphate; for the selective hydrogenation of the triple bond, palladium charcoal, onto which quinoline had been adsorbed before use, is preferred. The introduction of hydrogen is stopped as soon as the calculated quantity of hydrogen has been taken up. It is not necessary to isolate and to purify the hydrogenation product, i. e., 1-hydroxy-3,7-dimethyl-6-hydroxy-9-trimethyl-cyclohexenyl-nonatriene-(2,4,7). It is a viscous, yellowish oil, not absorbing ultraviolet rays of higher wave length than 260 mµ; dissolved in arsenic trichloride it shows blue colour. $n_D^{20}=1.524$.

The condensation product IV formed by partial hydrogenation is treated, preferably after protection of the terminal hydroxyl group by partial esterification, with a means effecting a so-called allyl rearrangement (see, for instance, Hückel, "Theoretische Grundlagen der organischen Chemie," 3rd edition, vol. I, pages 277 &c., Leipzig 1940), whereby a migration of the hydroxyl group in position 6 into position 8, in given cases with simultaneous substitution, and of the adjacent double bond into position 6 takes place. A method is chosen whereby no undesired side-reactions (polymerisation and the like) take place. For this purpose, the terminal hydroxyl group may be esterified by the action of 1 mol of an organic acylating agent, such as, for instance, lower fatty acid anhydrides, acetyl chloride, palmitic acid chloride or β-naphthoic acid chloride. The 1-acyloxy-3,7-dimethyl-6-hydroxy-9-trimethyl-cyclohexenyl-nonatriene-(2,4,7) thus formed may be reacted with one equivalent of a phosphorus halide at low temperature and in the presence of an inert solvent; for this reaction phosphorus tribromide has proved to be well suitable. The tetraene IV may also be treated with excess acylation agents (fatty acid anhydrides, palmitic acid chloride or β-naphthoic acid chloride) whereby, simultaneously with the esterification, the migration of the double bond may take place. The allyl rearrangement may also be effected without substitution, for instance, by heating in an inert solvent, such as xylol, preferably in the presence of a dehydrating agent. The reaction products are deemed to correspond to Formula V. Isolation thereof is not necessary. The halides are somewhat unstable; they cannot be distilled without decomposing; when left to stand at room temperature, the bromo compounds darken. As far as the splitting off, which is to be effected in the next reaction step, has not already taken place (for instance, splitting off of water from the 8-hydroxy-tetraene under the reaction conditions), it is recommended, especially with respect to the halides, to proceed with the further working up as quickly as possible.

For the purpose of introducing a further double bond into compound V, water or acid, respectively, are split off. Any known method for this purpose (see, for instance, Houben-Weyl, "Methoden der organischen Chemie," vol. II, pages 947-954, Leipzig 1925) may be used, provided the pentaene (vitamin A) formed thereby is stable to the reaction conditions. The splitting off of acid may be effected by the action of a basic agent, if necessary in the presence of a solvent. Thus, for instance, potassium carbonate in boiling acetone may be used for splitting off hydrogen halide, and heating in vacuo for splitting off carboxylic acid. It is of advantage to choose conditions whereby the acid split off is currently separated from the reaction mixture. The corresponding splitting off of water takes place by heating with dehydrating agents, preferably in the presence of an inert solvent, thus, for instance, the tetraene may be boiled in an inert solvent of a boiling point ranging from 80 to 150° C., such as, for instance, xylol, in the presence of a small quantity of iodine. The product formed corresponds to Formula VI, whereby the terminal functional group may be either a free or an esterified hydroxyl group, if desired, the esters thus obtained can be saponified to yield free vitamin A. According to the present invention, the following method, too, will yield vitamin A esters or the free vitamin, respectively: 4-(2',6',6' - trimethyl - cyclohexene-(1')-yl)-2-methyl - butene-(2)-al-(1) is condensed, by means of a Grignard reaction with 1-hydroxy - 3 - methyl-pentene-(2)-yne-(4). The condensation product thus formed is reacted with 1 mol of an acylating agent, whereupon 1 mol of hydrogen is added, by means of catalytic hydrogenation, to the triple bond of the compound obtained. For the purpose of allyl rearrangement and dehydration the tetraene thus formed is heated, preferably in the presence of a small portion of iodine, and, if desired, the vitamin A ester thus obtained can be hydrolised.

The allyl rearrangement and the dehydration may also be carried out previous to the partial hydrogenation of the triple bond. In this case, the synthesis is carried out according to the following sequence of the formulae in columns 1 and 2: I, II, III, VII, VIII and VI; also in this case it is of advantage to esterify the terminal hydroxyl group of the condensation product III. The measures for the carrying out of the various steps remain the same as hereinbefore described.

By the described methods vitamin A or vitamin A esters, respectively, are obtained, possessing the same biological activity as vitamin A or its derivatives obtained from natural sources. The products obtained according to the present process are characterized by causing a maximum of absorption in ultraviolet spectrum at 328 m$\mu$ and by the colour reactions with antimony trichloride (maximum of absorption at 620 m$\mu$ and at 580 m$\mu$), arsenic trichloride, aluminum silicate ("Tonsil") and trichloro-acetic acid, specific to vitamin A.

The products of the present process may be purified by the same methods as high concentrates of vitamin A and its derivatives from natural sources (separation between solvents, chromatographic adsorption, careful distillation and crystallisation). Like natural vitamin A, the products should be protected from the deteriorating effects of light, air and heat. It is advisable to add antioxidants which may be present during the whole course of the synthesis; tocopherols are particularly suitable as antioxidants.

As compared with the free alcohol, the highly active vitamin A esters have the advantage of greater stability. The vitamin A acetate is particularly stable and can be prepared easily.

*Example 1*

A solution consisting of 20 parts by weight of 1-hydroxy-3-methyl-pentene-(2)-yne-(4) in 50 parts by volume of ether is added to a boiling ethyl-magnesium-bromide solution (obtained from 10 parts by weight of magnesium, 46 parts by weight of ethyl bromide and 150 parts by volume of ether) in the course of one hour while stirring well. In order to complete the reaction, the mixture is refluxed at an oil-bath temperature ranging from 60 to 70° C. for three hours. Thereby the magnesium compound of the 1-hydroxy - 3 - methyl-pentene-(2)-yne-(4) precipitates as a grey sludge. In the course of one hour 34 parts by weight of 4-(2',6',6'-trimethyl-cyclohexen-(1')-yl)-2-methyl-butene-(2)-al-(1) in 60 parts by volume of ether are added while cooling with ice and introducing nitrogen. Stirring of the reaction mixture at 20° C. is continued and the mixture is refluxed for a further hour. Thereupon 200 parts by volume of ether are added and the mixture is hydrolised with ice and amminum chloride. After washing, drying and concentrating the ether-solution 51 parts by weight of crude, yellow-brownish condensation product are obtained. The non-reacted starting material is now distilled off in high vacuo at an oil-bath temperature of 130° C. 40 parts by weight of crude condensation product are obtained as residue. The latter is dissolved in petroleum ether of boiling point 60 to 80° C. and adsorbed onto a column consisting of 800 parts by weight of moderately active aluminum oxide. The same solvent serves to wash out dark coloured particles, mainly consisting of dehydration products. The ether-eluate consists of pure 1-hydroxy-3,7-dimethyl-6-hydroxy-9-(2',6',6')-trimethyl-cyclohexene-(1')-yl)-nonadiene-(2,7)-yne-(4). The yield with respect to 4-trimethyl-cyclohexenyl-2-methyl-butenal amounts to about 50 per cent. It is a light-yellow, very viscous oil of $n_D^{20}$=1.527. The compond contains 2 active hydrogen atoms and in the ultraviolet absorption spectrum it does not show any absorption above 260 m$\mu$.

10 parts by weight of 1-hydroxy-3,7-dimethyl-6 - hydroxy - 9 - trimethyl - cyclohexenyl-nonadiene-(2,7)-yne-(4) are dissolved in 100 parts by volume of methyl alcohol and are hydrogenated after addition of 0.3 part by weight of a 4 per cent. palladium calcium-carbonate catalyst containing 0.2 part by weight of pyridine. As soon as 1 mol of hydrogen has been absorbed the hydrogenation is stopped and the reaction mixture is filtered off from the catalyst. On evaporating the solvent, 1-hydroxy-3,7-dimethyl-6-hydroxy-9 - (2',6',6' - trimethyl - cyclohexene - (1') - yl-nonatriene - (2,4,7) is obtained in quantitative yield. It is a light-yellow, very viscous oil: $n_D^{20}$=1.524. The compound contains two active hydrogen atoms and, in the ultraviolet absorption spectrum, it does not show any absorption above 260 m$\mu$.

1 part by weight of 1-hydroxy-3,7-dimethyl-6-hydroxy-9-trimethyl - cyclohexenyl - nonatriene-(2,4,7) is dissolved in 20 parts by volume of petroleum ether of boiling point 80–120° C. and 0.1 part by weight of a 50 per cent. aqueous hydriodic acid is added at boiling temperature while introducing nitrogen and stirring vigorously. The mixture is refluxed for a further 15 minutes, cooled down and successively washed with sodium bicarbonate solution and water whereupon the petroleum ether solution is dried with sodium sulphate. After distilling off the solvent, an orange-yellow oil is obtained containing about 10 per cent. vitamin A alcohol.

The purification of the crude product thus obtained may, for instance, be effected by a percolation chromatogram through columns of moderately active aluminum oxide by means of petroleum ether of boiling point 60–80° C. The eluate of the yellow-greenish fluorescent main zone yields a yellow vitamin A alcohol compound, the ultraviolet absorption spectrum of which shows a distinct maximum at 325 m$\mu$.

For carrying out the allyl rearrangement and the dehydration, the partially hydrogenated condensation product, instead of being heated with hydriodic acid, may be heated with a small portion of iodine. In the latter case, the presence of an inert solvent is of advantage, though not indispensable.

Example 2

2 parts by weight of 1-hydroxy-3,7-dimethyl-6-hydroxy-9 - trimethyl - cyclohexenyl - nonatriene-(2,4,7), obtained in accordance with Example 1, are dissolved in 40 parts by volume of ether, reacted with a mixture consisting of 1 part by weight of acetyl chloride and 2 parts by weight of glacial acetic acid and heated for one hour to slight boiling. After cooling down, the reaction mixture is taken up in petroleum ether, successively washed with aqueous methyl alcohol, bicarbonate solution and water, dried and the solvent is evaporated. The residue is a yellow oil, containing one acetyl group, and, in the ultraviolet spectrum, absorbing light of 320–330 m$\mu$. When fed to vitamin A deficient rats, the crude product thus obtained shows high biological activity.

In order to bring about esterification, allyl rearrangement and dehydration, the partially hydrogenated condensation product may also be boiled with acetic anhydride in the presence of alkali acetate, instead of using acetyl chloride and glacial acetic acid.

The crude products thus obtained are chromatographed onto an aluminum oxide column according to the methods known for the purification of vitamin A ester concentrates obtained from natural sources (see, for instance, "Helvetica Chimica Acta," vol. 27, year 1944, page 443). By elution of the strong yellow fluorescent layer, a still impure vitamin A acetate in form of a yellow oil is obtained. In the ultraviolet absorption spectrum it shows a sharp maximum at 326 m$\mu$, as characteristic for pentaenes, and the Carr-Price-reaction shows intensive blue colouring with the main maximum of absorption at 620 m$\mu$ and a secondary maximum at 580 m$\mu$.

50 parts by volume of fresh 1 normal ethanolic potassium hydroxide solution are added to 1 part by weight of the said purified product under complete exclusion of air, hydrolysation is brought about by short heating in a water-bath. Thereupon 100 parts of water and 50 parts by volume of petroleum ether of boiling point 30–60° C. are added, the aqueous layer is separated off, washed with water and the solvent is evaporated. The residue is chromatographed onto an aluminum oxide column, accordance with the methods given for corresponding products obtained from natural sources (see, for instance, "Helvetica Chimica Acta," vol. 27, year 1944, page 443). The eluate of the yellow-greenish fluorescent main layer yields a yellow vitamin A alcohol product, the ultraviolet absorption spectrum of which shows a distinct maximum at 325 m$\mu$. The compound shows the colour reactions typical for vitamin A and is of high biological activity.

Example 3

1 part by weight of 1-hydroxy-3,7-dimethyl-6-hydroxy-9-trimethyl - cyclohexenyl - nonatriene-(2,4,7), prepared in accordance with Example 1, is dissolved in 5 parts by volume of pyridine in 5 parts by volume of benzene and reacted with a solution of 1.1 parts by weight of palmitic acid chloride in 5 parts by volume of benzene. The mixture is stirred for 14 hours at room temperature. Thereupon the mixture is diluted with petroleum ether of boiling point 30–60° C., successively washed with bicarbonate solution and water, dried with sodium sulphate and concentrated. A viscous oil is obtained which on the Zerewitinoff analysis gives values for one active hydrogen atom.

5 parts by weight of the product thus obtained are heated with 50 parts by volume of petroleum ether of boiling point 80–120° C. and a solution of 0.1 part by weight of iodine in 10 parts by volume of petroleum ether of boiling point 80–120° C. is added in an inert atmosphere while stirring. The mixture is refluxed for 15 minutes, left to cool down, diluted with petroleum ether of boiling point 30–60° C., successively washed with 95 per cent. methyl alcohol and water, dried and the solvent is evaporated. The residue is a yellow oil, showing in the ultraviolet absorption spectrum a maximum at 328 m$\mu$ and in the Carr-Price-reaction a main absorption maximum at 620 m$\mu$ and a secondary maximum at 580 m$\mu$. The product can be purified in accordance with the methods given in Example 2 above.

Example 4

A solution of 20 parts by weight of 1-hydroxy-3-methyl-pentene-(2)-yne-(4) in 100 parts by volume of ether is added to a boiling solution of ethyl magnesium bromide (obtained from 10 parts by weight of magnesium, 47 parts by weight of ethyl bromide and 100 parts by volume of ether) in the course of one hour while stirring vigorously. In order to complete the reaction, the mixture is refluxed for 4 hours at an oil bath temperature of 60° C. Thereby the magnesium compound separates as a grey sludge. 22 parts by weight of 4 - (2',6',6' - trimethyl-cyclohexene-(1')-yl)-2-methyl-butene-(2)-al-(1) in 50 parts by volume of ether are added in the course of one hour while cooling with ice and introducing nitrogen. The reaction mixture is then stirred for further 12 hours at 20° C. and then refluxed for 2 hours. 200 parts by volume of ether are added and then a well cooled solution of 100 parts by volume of a 10 per cent. ammonium chloride solution is slowly admixed. After washing, drying and concentrating the ethereal solution 42 parts of crude brown condensation product are obtained.

The excess 1-hydroxy-3-methyl-pentyne is now distilled off in high vacuo. The residue is distilled in a molecular still at 10$^{-5}$ mm. Hg at 120–130° C. Almost pure 1-hydroxy-3,7-dimethyl-6-hydroxy-9 - trimethyl - cyclohexenyl - nonadiene-(2,7)-yne-(4) is obtained. The yield, with respect to 4 - trimethyl - cyclohexenyl-2-methyl-butenal, amounts to 60–70 per cent. It is a yellow, very viscous oil.

4 parts by weight of 1-hydroxy-3,7-dimethyl-

6 - hydroxy-9-trimethyl-cyclohexenyl-(2,7)-yne-(4) are dissolved in 100 parts by volume of methyl alcohol and hydrogenated at room temperature after addition of 0.2 part by weight of 4 per cent. palladium charcoal onto which 0.1 part by weight of quinoline had previously been adsorbed. The speed of hydrogen absorption increases at the beginning, but decreases after absorption of 0.7–0.8 mol. After 1 mol of hydrogen has been taken up, the hydrogenation is interrupted and the catalyst is sucked off. The filtrate is concentrated in vacuo and the residue is fractionated in a molecular still. 3.5 parts by weight of almost pure 1-hydroxy-3,7-dimethyl-6 - hydroxy - 9 - trimethyl-cyclohexenyl-nonatriene-(2,4,7) of boiling point 100–110° C. and 10⁻⁵ mm. Hg are obtained.

1 part by weight of 1-hydroxy-3,7-dimethyl-6-hydroxy-9-trimethyl - cyclohexenyl - nonatriene-(2,4,7) is dissolved in 10 parts by weight of pyridine and 0.36 part by weight of acetic anhydride are added. After standing for 14 hours at 20° C. the mixture is diluted with petroleum ether of boiling point 30–60° C., successively washed with 1 n sulphuric acid, bicarbonate solution and water, dried with sodium sulphate and concentrated. The residue boils in high vacuo at an oil-bath temperature of 180° C. and 0.01 mm. Hg. It is a viscous oil. $n_D^{20}=1.508$, $$d_4^{20}=0.993$$

5 parts by weight of the partially esterified compound are refluxed in 100 parts by volume of petroleum ether of boiling point 80–120° C. while introducing nitrogen and stirring. In the course of 10 minutes, a solution of 0.1 part by weight of iodine in 20 parts by volume of petroleum ether (boiling point 80–120° C.) is added. Refluxing and stirring are continued for further 20 minutes. The mixture is then left to cool down, diluted with petroleum ether of boiling point 30–60° C. It is then successively washed with thiosulphate solution, 90 per cent. methyl alcohol and water, dried and the solvent is evaporated. The residue is a yellow oil, showing in the ultraviolet spectrum a distinct maximum at 328 mμ, and, on the Carr-Price-reaction, a main absorption maximum at 620 mμ and a secondary maximum at 580 mμ.

The allyl rearragnement and dehydration of the partially acetylated compound may also be carried out in an analogous manner by boiling in petroleum ether with a small portion of a compound capable of easily splitting off iodine, such as, for instance, hydriodic acid, phosphorus diiodide or halogen iodide. The same product can also be obtained by boiling 1 part by weight of 1-acetoxy-3,7-dimethyl-6-hydroxy-9-trimethyl-cyclohexenyl-nonatriene-(2,4,7) in 10 parts by volume of toluene with 0.25 part by weight of a strong organic carboxylic acid, such as, for instance, glycolic acid, phthalic acid, malonic acid or oxalic acid.

The crude products thus obtained are chromatographically purified, in accordance with the methods given in Example 2, hydrolysed and chromatographed again. Thereupon vitamin A acetate and a vitamin A alcohol, respectively, are obtained showing the characteristic ultraviolet absorption spectrum. The compounds prove to possess full biological activity.

*Example 5*

1 part by weight of 1-hydroxy-3,7-dimethyl-6-hydroxy-9-trimethyl-cyclohexenyl-nonadiene-(2,7)-yne-(4), prepared in accordance with Example 1, is dissolved in 5 parts by volume of pyridine in 5 parts by volume of benzene and reacted with a solution of 0.29 part by weight of acetyl chloride in 5 parts by volume of benzene. The mixture is stirred in a nitrogen atmosphere for 12 hours at 20° C. and the product is worked up by successively washing with 1 n sulphuric acid, bicarbonate solution and water. After evaporation of the solvent, 1.1 part by weight of 1 - acetoxy-3,7-dimethyl-6-hydroxy-9-trimethyl-cyclohexenyl - nonadiene - (2,7) - yne - (4) is obtained which boils in high vacuo at an oil bath temperature of 180° C. under a pressure of 0.01 mm. Hg. $n_D^{21}=1.518$.

$$n_1^{12}=0.998$$

On quantitative hydrolysation, values corresponding to one acetyl group are obtained. The Zerewitinoff analysis indicates one active hydrogen atom.

1 part by weight of the partially acetylated condensation product is dissolved in 20 parts by volume of methyl alcohol and hydrogenated at 20° C. in the presence of 0.1 part by weight of palladium calcium-carbonate catalyst. After 1 mol hydrogen has been taken up, the hydrogenation is interrupted. The catalyst is filtered off, the mixture is diluted with petroleum ether of boiling point 30–60° C., washed with water, dried with sodium sulphate and the solvent is evaporated. The 1-acetoxy-3,7-dimethyl-6-hydroxy-9-trimethyl-cyclohexenyl-nonatriene-(2,4,7) thus obtained is identical with the compound described in Example 4.

1 part of the hydrogenated compound is dissolved in 20 parts by volume of toluene and refluxed, in an inert atmosphere, for one hour with 0.25 part by weight of finely pulverised phthalic acid anhydride. After cooling down, the product is taken up in petroleum ether of boiling point 30–60° C., successively washed with bicarbonate solution, 95 per cent. methyl alcohol and water, dried with sodium sulphate and the solvent is evaporated. The residue is a yellow oil, showing in the ultraviolet spectrum a distinct maximum at 328 mμ, and, on the Carr-Price reaction, a main absorption maximum at 620 mμ and a secondary maximum at 580 mμ. The product may be purified by the methods disclosed in Examples 1 and 4.

*Example 6*

1 part by weight of 1-acetoxy-3,7-dimethyl-6-hydroxy - 9 - trimethyl - cyclohexenyl - nonadiene-(2,7)-yne-(4), prepared in accordance with Example 5, is boiled in 20 parts by volume of petroleum ether of boiling point 80–120° C. and a solution of 0.02 part by weight of iodine in 5 parts by volume of petroleum ether of boiling point 80–120° C. is added while refluxing and stirring in an inert atmosphere. Refluxing is continued for a further 15 minutes, then the mixture is left to cool down, diluted with petroleum ether of boiling point 30–60° C., successively washed with 95 per cent. methyl alcohol and water, and the solvent is evaporated.

The rearranged and dehydrated product thus obtained (about 0.06 part by weight) is stirred with 2 parts by weight of pulverized zinc in 6 parts by volume of 80 per cent. acetic acid and 6 parts by volume of methyl alcohol for 6 hours at 40° C. Thereupon the zinc is filtered off, the filtrate is reacted with petroleum ether of boiling point 30–60° C., successively washed with 90 per cent. methyl alcohol and water and the solvent is evaporated. The residue may be purified in accordance with the methods given in Example 2.

This application is a continuation-in-part of my co-pending applications Serial Nos. 703,483 and 703,484, filed October 16, 1946, and 727,733 and 727,734, filed February 10, 1947.

I claim:

1. Process which comprises condensing a product of the formula

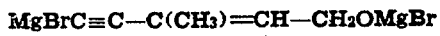

with 4-(2',6',6'-trimethyl-cyclohexene-(1')-yl)-2-methyl-butene-(2)-al-(1).

2. Process according to claim 1, including a subsequent hydrolysis of the condensation product.

3. Process which comprises hydrolyzing a compound of the formula

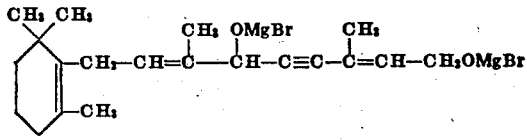

to obtain 1-hydroxy-3,7-dimethyl-6-hydroxy-9-trimethyl-cyclohexenyl-nonadiene-(2,7)-yne-(4).

4. Process according to claim 3 in which the 1-hydroxy-nonadiene is partially hydrogenated to the corresponding nonatriene-(2,4,7).

5. Process according to claim 4 in which the nonatriene is converted to vitamin A alcohol.

6. Process which comprises partially hydrogenating 1-hydroxy-3,7-dimethyl-6-hydroxy-9-[2',6',6'-trimethyl-cyclohexene-(1')-yl]-nonadiene-(2,7)-yne-(4) to the corresponding nonatriene-(2,4,7).

7. 1-Hydroxy-3,7-dimethyl-6-hydroxy-9-[2',6',6'-trimethyl-cyclohexene-(1')-yl]-nonatriene-(2,4,7).

8. 1-Acyloxy-3,7-dimethyl-6-hydroxy-9-[2',6',6'-trimethyl-cyclohexene-(1')-yl]-nonatriene-(2,4,7).

9. Process which comprises partially hydrogenating 1-acyloxy-3,7-dimethyl-6-hydroxy-9-[2',6',6'-trimethyl-cyclohexene-(1')-yl]-nonadiene-(2,7)-yne-(4) to the corresponding nonatriene-(2,4,7).

10. As a new product, 1-hydroxy-3,7-dimethyl-6-hydroxy-9-[2',6',6'-trimethyl-cyclohexene-(1')-yl]-nonadiene-(2,7)-yne-(4).

11. Process which comprises reducing 1-hydroxy-3,7-dimethyl-6-hydroxy-9-[2',6',6'-trimethyl-cyclohexene-(1')-yl]-nonadiene-(2,7)-yne)-(4) to the corresponding nonatriene-(2,4,7).

12. Process which comprises reacting 1-hydroxy-3,7-dimethyl-6-hydroxy-9-[2',6',6'-trimethyl-cyclohexene-(1')-yl]-nonatriene (2,4,7) with an acylating agent to form the corresponding 1-acyloxy-6-hydroxy compound.

13. Process of claim 12 wherein an acetylating agent is employed as the acylating agent to form the corresponding 1-acetoxy compound.

14. Process which comprises rearranging and dehydrating 1-acyloxy-6-hydroxy-3,7-dimethyl-9-[2',6',6'-trimethyl-cyclohexene-(1')-yl]-nonatriene-(2,4,7) to form a corresponding vitamin A ester.

15. Process according to claim 14, in which "acyloxy" is "acetoxy" and the ester that is formed is vitamin A acetate.

16. Process according to claim 14, in which the rearrangement and dehydration is effected by means of iodine.

17. Process according to claim 14, in which the rearrangement and dehydration is effected by means of a phosphorous halide.

18. 1-Acetoxy-3,7-dimethyl-6-hydroxy-9-[2',6',6'-trimethyl-cyclohexene-(1')-yl]-nonatriene-(2,4,7).

19. Process which successively comprises the steps of hydrogenating and rearranging and dehydrating a compound from the group consisting of 1-hydroxy-3,7-dimethyl-6-hydroxy-9-[2',6',6'-trimethyl-cyclohexene-(1')-yl]-nonadiene-(2,7)-yne-(4) and 1-acetoxy-3,7-dimethyl-6-hydroxy-9-[2',6',6'-trimethyl-cyclohexene-(1')-yl]-nonadiene-(2,7)-yne-(4).

20. A compound of the group consisting of 1-hydroxy-3,7-dimethyl-6-hydroxy-9-[2',6',6'-trimethyl-cyclohexene-(1')-yl]-nonadiene-(2,7)-yne-(4), the 1-6-di-Grignard thereof, the corresponding nonatriene-(2,4,7) thereof, the 1-acyloxy derivative thereof, the 1-6-diacyloxy derivative of the corresponding nonatriene-(2,4,7) thereof, and the 1-acyloxy derivative of the corresponding nonatriene-(2,4,7) thereof.

21. The group of compounds according to claim 20 in which "acyloxy' is "acetoxy."

OTTO ISLER.

REFERENCES CITED

The following references are of record in the file of this patent:

UNITED STATES PATENTS

| Number | Name | Date |
|---|---|---|
| 2,369,161 | Milas | Feb. 13, 1945 |

FOREIGN PATENTS

| Number | Country | Date |
|---|---|---|
| 560,081 | Great Britain | Mar. 20, 1944 |

OTHER REFERENCES

Heilbron et al.: Chem. Soc. Jour. (1942), pages 727–33; ibid., (1945), pages 84–87 and 90–94.

Certificate of Correction

Patent No. 2,451,739.　　　　　　　　　　　　　　　　　October 19, 1948.

OTTO ISLER

It is hereby certified that errors appear in the printed specification of the above numbered patent requiring correction as follows:

Column 6, lines 27 and 28, for "amminum" read *ammonium*; line 42, strike out the closing parenthesis after "2′, 6′, 6′ "; column 7, line 71, before the word "accordance" insert *in*; column 9, line 49, for "rearragnement" read *rearrangement*; column 10, line 15, in the equation, for "$n_4^{22}$" read $d_4^{22}$; line 67, for "0.06 part" read *0.6 part*; column 11, line 54, claim 11, strike out the closing parenthesis after "yne"; column 12, line 41, strike out the single quotation mark after "acyloxy" and insert instead a double quotation mark;

and that the said Letters Patent should be read with these corrections therein that the same may conform to the record of the case in the Patent Office.

Signed and sealed this 1st day of March, A. D. 1949.

[SEAL]

THOMAS F. MURPHY,
*Assistant Commissioner of Patents.*